United States Patent

[11] 3,579,894

[72] Inventor Ephraim Henry Kidder
617 Selma, Cadillac, Mich. 49601
[21] Appl. No. 809,513
[22] Filed Mar. 24, 1969
[45] Patented May 25, 1971

[54] FISH-IMPALING AND GRAPPLING IMPLEMENT
8 Claims, 5 Drawing Figs.

[52] U.S. Cl. ............................................. 43/6
[51] Int. Cl. ......................................... A01k 81/04
[50] Field of Search ........................................ 43/5, 6, 89; 294/26, 61

[56] References Cited
UNITED STATES PATENTS

| | | | |
|---|---|---|---|
| 1,080,868 | 12/1913 | Turner | 43/5 |
| 2,864,196 | 12/1958 | Rohan | 43/6 |
| 3,014,305 | 12/1961 | Yurchich | 43/6 |
| 3,036,395 | 5/1962 | Nelson | 43/6 |
| 3,092,925 | 6/1963 | Ho et al. | 43/5 |
| 3,267,603 | 8/1966 | Josephs et al. | 43/5 |

Primary Examiner—Warner H. Camp
Attorneys—Clarence A. O'Brien and Harvey B. Jacobson ABSTRACT: A fish-impaling, grappling and landing implement embodying self-contained features which well serve the purposes for which they have been devised. An elongated handle embodies compact and convenient telescoping latch-retained sections. The forward end embodies an axial spearing prong and openable and closable grappling jaws provided with inwardly angled fish-impaling tines. A shiftable latch-retained sleeve provides a ferrule which releasably fastens pivoted shank portions of the jaws in fish grappling position.

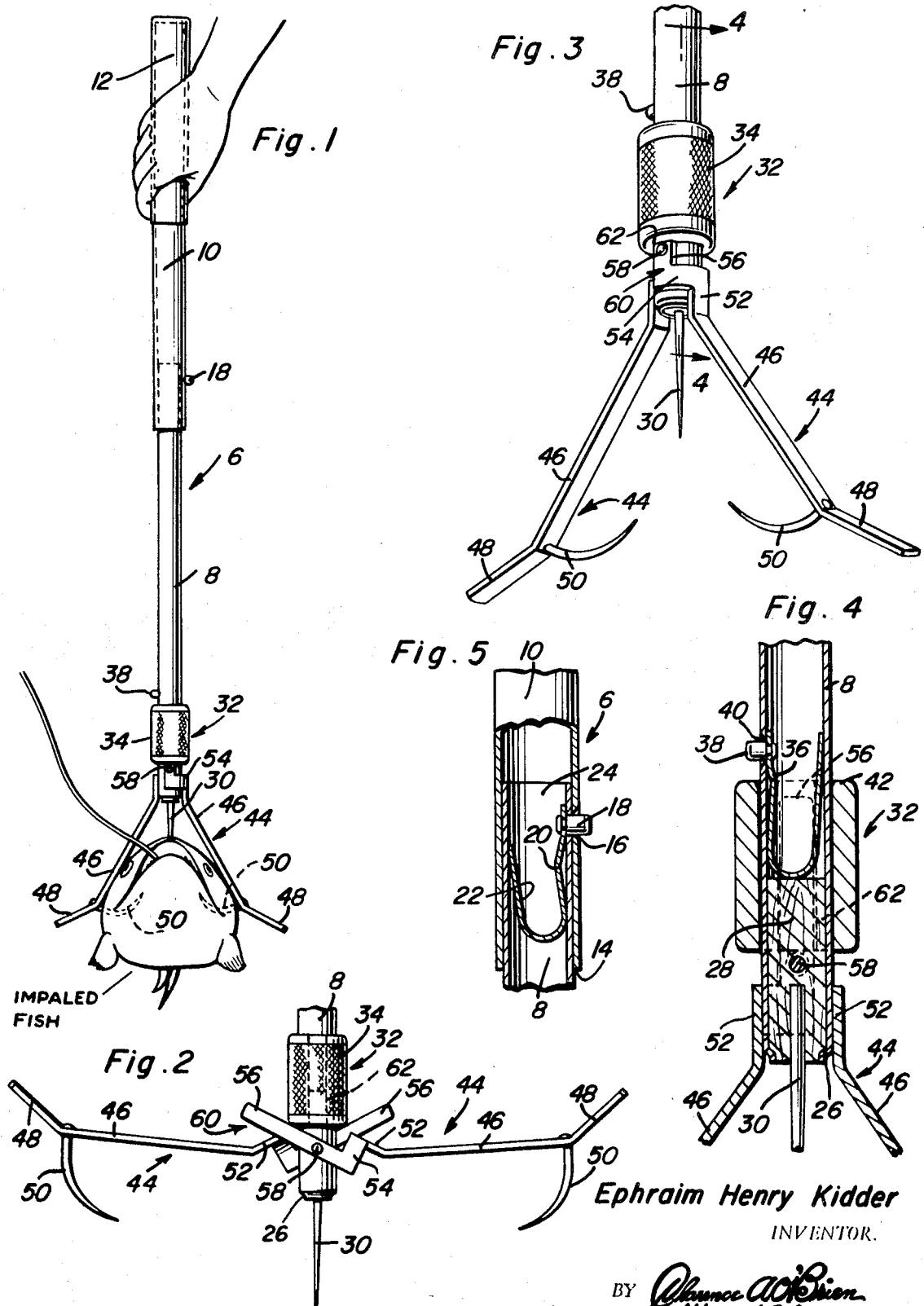

FISH-IMPALING AND GRAPPLING IMPLEMENT

This invention relates to certain new and useful improvements in a manually usable spearing, grappling and impaling implement which is expressly designed and acceptably adapted to enable an experienced fisherman to handle and land large and elusive fish such as chinook and the like.

The implement disclosed is such in construction that it enables the user to accurately aim and pilot the rigid needlelike spearing prong and, having done so, to force the tine-equipped grappling jaws over the hooked fish so that the struggling fish, aided by a regulable upward pull by the angler, virtually assures that the jaw-embraced and impaled fish can then be controllably handled and safely landed.

Briefly, the implement comprises handle means provided on a leading or forward end with an axially projecting spearing prong and a pair of jaws situated on diametrically opposite sides of the intervening prong. The handle means is made up of a forward section and a complemental hollow rearward section into which the forward section is telescopingly and adjustably fitted. When extended for use these companion sections provide an amply long easy-to-use handle. When not in use the sections can be retracted for compactness and storing. The paired jaws have specially designed shanks which are pivotally hinged on the leading end of the forward section. A ferrulelike sleeve or collar is shiftably slidable on said leading end and, when properly set and latched in place it stays put, embraces the shank portions, and maintains the gripping or grappling jaws in fish-clamping positions. Each jaw is provided with a curvate tine and the two tines impale and hold the fish securely.

In carrying out the embodiment of the implement shown the pivoted shank portions are preferably L-shaped in plan and the long arm of each shank portion is pivoted intermediate its ends and can be and constitutes a keeper, the latter being seated in a keeper groove which is provided therefor in the bore of the manually shiftable sleeve. This sleeve is limited when slid in an inward direction by a spring-biased latch button. More specifically, two latch buttons are provided, one for the coordinating handle sections and the other one for the sleeve, as above set forth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in elevation of a fish impaling and grappling implement constructed in accordance with the invention and showing the manner in which it is adaptably used to spear, impale and grip a large fish for landing purposes.

FIG. 2 is a fragmentary view based on FIG. 1 with the handle substantially omitted and with the grappling and impaling jaws swung to an open fish-releasing position.

FIG. 3 is a view in perspective fragmentarily shown and on a larger scale and which serves to emphasize the construction arrangement and coaction of the jaws and the jaw-holding and releasing sleeve with the jaws closed and the sleeve in its forward retaining position.

FIG. 4 is a fragmentary detail view with parts in section and elevation taken approximately on the plane of the section line 4—4 of FIG. 3 looking in the direction of the indicating arrows.

And FIG. 5 is a fragmentary sectional and elevational view detailing the button-type latch which is employed in the manner shown in FIG. 1 to releasably latch the handle sections in axially aligned ready-to-use position and relationship.

The extensible and retractable elongated handle means is denoted in FIG. 1 by the numeral 6. This means can be of any suitable material and of requisite length to accommodate the reach required by the fisherman in spearing and grappling the fish. As shown this handle means is preferably made up of an elongate tubular forward section or end portion which is denoted at 8 and which is of a cross section to fit slidingly and telescopingly into the hollow part of the rearward end portion or section 10. The latter section is provided with an appropriate antislipping plastic, rubber or equivalent grip 12. As shown in FIG. 5 the section 10 is provided short of its end 14 with an aperture or hole of suitable size and shape as at 16 to accommodate a spring-biased normally projected latch button 18. This button is mounted on one arm 20 of an enclosed U-shaped spring, that is a leaf spring 22 which is operatively confined in the end portion 24 of the handle section 8.

Referring now to FIG. 4 and to the reduced or restricted terminal end portion 26 of the handle section 8 it will be seen that a wooden core or filler block 28 is secured therein to stabilize the construction and also to provide an anchor for a cooperating end portion of a rigid axially projecting fish-spearing prong 30. This end portion of the section 8 is also provided with a snug-fitting but manually shiftable ferrulelike retainer collar or sleeve 32. This collar is suitably knurled as at 34 and is of a length to serve the jaw-retaining purposes which it serves. Before discussing the jaw means attention is directed to the fact that a second leaf spring, which is also U-shaped in form, is provided as at 36 and the spring is confined in the hollow part of the section 8 and is provided with a second latching button 38 which is the same in construction as the first-mentioned latching button 18. In this arrangement, the button 38 projects through a hole 40 provided therefor where it is conveniently actuatable. The button 38 is normally in the position shown in FIGS. 1, 3 and 4 and is cooperable with an end portion 42 of the sleeve or collar 32 to normally locate the sleeve or collar in its retaining position.

With respect now to the grappling jaws, two such jaws are provided and the jaws are identical in construction and each jaw is denoted by the numeral 44. These jaws are located diametrically opposite each other, that is, on diametrically opposite sides of the aforementioned spearing prong 30. Each jaw is made from strap metal and the body portion is denoted at 46 and a free laterally flared end portion is denoted at 48. At the juncture of the portions 46 and 48 a rigid longitudinally bowed or curved impaling tine 50 is provided. The opposite laterally directed end portion 52 of each jaw is provided with a substantially L-shaped shank portion. The shank portion is integral with the end 52 and has a short arm or leg 54 and a long arm or leg 56 which is superimposed on a surface of the handle portion and is pivotally mounted intermediate its ends as at 58. This L-shaped portion is conveniently designated by the numeral 60. When the jaws are open the L-shaped shank portions assume the positions shown in full lines in FIG. 2. When the jaws are closed in fish-gripping relationship (FIGS. 1, 3 and 4) the long arms 56 are and constitute keepers. Each keeper is releasably seatable in a longitudinal keeper groove 62 which is provided therefor in the bore of the aforementioned sleeve 32. It will be evident therefore that when the sleeve 32 is in the position shown in FIGS. 1, 3 and 4 in particular, it is held against displacement by the aforementioned latch button 38. The sleeve in turn releasably holds the L-shaped shank portions 60 in diametrically opposite relationship and consequently retains the jaws 44 in their fish-gripping position in the manner illustrated for example in FIG. 1.

The manner of using the reach handle 6 and the set collar-retained jaws 44 is shown in FIG. 1 wherein it will be evident that the handle components or sections 8 and 10 are extended and are held in this relationship by way of the aforementioned latch button 18. The shank portions 60 of the opposed coacting jaws 44 are seated in the keeper grooves 62 and held in that position and relationship by the collar or sleeve 32. The sleeve in turn is maintained in this given position by way of the outstanding but depressible latch button 38. It follows that the user can catch hold of the handgrip 12 as illustrated in FIG. 1 and can aim the pointed spear 30 at the hooked fish and when in position can embed the spearing prong after which and by pushing on the jaws the jaws can be spread to straddle the fish. Consequently when the fish starts to struggle and the handle and jaw means is properly maneuvered by the fisherman the impaling tines 50 come into play and the fish is thus gripped or grappled and can be handled and landed in a now generally well-known manner. The jaws can be spread open to the position shown in FIG. 2 thus withdrawing the tines 50 and releasing the fish.

The foregoing is considered as illustrative only of the principles of the invention. Further, since numerous modifications and changes will readily occur to those skilled in the art, it is not desired to limit the invention to the exact construction and operation shown and described.

I claim:

1. A fish-handling, grappling and impaling implement comprising elongated handle means having forward and rearward end portions and provided at its forward end portion with a rigid axially projecting fish-spearing prong, a pair of fish-grappling jaws disposed on diametrically opposite sides of said prong and spaced therefrom, said jaws having shank portions which are pivotally hinged on a leading end of said forward end portion, the median portions of said jaws having inturned cooperatively aligned terminally pointed impaling tines, a sleeve snugly but shiftably mounted on said forward end portion and cooperable with said shank portions in a manner to retain said shank portions in a given jaw-setting and holding position, the bore of said sleeve being provided with longitudinal keeper grooves, the aforementioned shank portions being L-shaped in plan and embodying long and short arms, said long arms providing keepers and being alignable with and seatable in but releasable from their respectively keeper grooves.

2. The fish-handling, grappling and impaling implement defined in and according to claim 1, and wherein said tines are curved lengthwise with their terminal pointed ends directed toward but spaced outwardly when in use from a coacting terminal end of said spearing prong.

3. The fish-handling, grappling and impaling implement defined in and according to claim 1, and wherein a portion of the handle means which is adjacent to said sleeve is provided with a spring-biased latch button, said button projecting outwardly beyond a surface of the handle portion and providing a sleeve retaining detent.

4. A fish-handling, grappling and impaling implement comprising an elongated extensible and retractable handle, said handle comprising a forward tubular section and a rearward tubular section into which the forward tubular section is telescopingly and fittingly slidable, said rearward section being provided with a handgrip and also provided with an opening for a latch, a spring-biased latch button carried by an end portion of the forward section and projecting normally and outwardly through the latch opening in a manner to maintain the sections in cooperating extended relationship while at the same time permitting the sections to be released and retracted into compact and convenient form at will, and a spearing prong affixed to a leading end of the forward section and projecting beyond said section, a collar shiftably slidable on an exterior surface of the forward section, a second latch button carried by said forward section and cooperable with an end portion of said sleeve to prevent sliding movement of the sleeve in one direction, a pair of fish-grappling jaws disposed on diametrically opposite sides of said prong and spaced therefrom, said jaws having shank portions and said shank portions being hinged on a leading end of the forward handle section, the median portions of said jaws having inturned cooperatively aligned pointed impaling tines.

5. The fish-handling, grappling and impaling implement defined in and according to claim 4 and wherein said tines are curved lengthwise and have their terminal pointed end portions directed toward but spaced from the coacting terminal end of the spearing prong.

6. The fish-handling, grappling and impaling implement defined in and according to claim 5 and wherein the bore in said sleeve is provided with diametrically opposite longitudinal keeper grooves, the aforementioned shank portions of the jaws being substantially L-shaped in plan and embodying long and short arms, said long arms being and providing keepers and said keepers being alignable with and seatable in but releasable from their respective keeper grooves.

7. A manually usable fish-handling, impaling and grappling implement comprising elongated handle means having forward and rearward end portions, said forward end portion being provided with a rigid axially projecting fish-spearing prong, a pair of forwardly projecting outwardly diverging fish-grappling jaws having free forward outwardly flaring end portions and rearward shank portions which are L-shaped in plan and embody long and short arms, the respective long arms providing keepers and having their respective median portions superimposed upon and pivotally hinged on coacting diametrically opposite sides of said forward end portion in a manner that said grappling jaws can be swung toward and from each other and opened or closed at will, median portions of said jaws having cooperatively aligned terminally pointed longitudinally curved fish-impaling tines which when in grappling positions are spaced outwardly of the terminal end of said spearing prong, a manually actuatable sleeve shiftably slidable on said forward end portion rearwardly of the pivotally hinged points of said long arms, said long arms being adapted to be aligned with said forward end portion when said jaws are swung toward each other to assume closed relationship, said sleeve being adapted to slide over and clampingly enclose said long arms whereby to provide keeper means therefor.

8. The fish-handling, grappling and impaling implement defined in and according to claim 7, and wherein a portion of the handle means which is adjacent to said sleeve is provided with a spring-biased latch button, said button projecting outwardly beyond a surface of the handle portion and providing a sleeve-retaining detent.